Dec. 12, 1950     J. ACONLEY     2,533,905
CHOKER HOOK AND LINE
Filed June 11, 1949

INVENTOR.
John Aconley
BY Alex. E. MacRae
Attorney.

Patented Dec. 12, 1950

2,533,905

UNITED STATES PATENT OFFICE 2,533,905

CHOKER HOOK AND LINE

John Aconley, Forestville, Quebec, Canada, assignor to Anglo-Canadian Pulp and Paper Mills Limited, Quebec, Quebec, Canada, a corporation of Quebec, Canada Application June 11, 1949, Serial No. 98,564

2 Claims. (Cl. 294—74)

This invention relates to choker lines and hooks, such as are employed in conjunction with cables, ropes and the like for the handling of objects, such as logs.

Choker hooks are frequently employed in logging and cargo handling operations and many types of such hooks have heretofore been proposed. Such hooks are normally employed in conjunction with a cable loop, which is passed around the object to be handled, one end of the loop being secured to a cable fastening means on the hook and the other end of the loop being engaged by a cable holding means on the hook.

There are several disadvantages inherent in choker hooks now in use. The cable holding means frequently fails to maintain the loop due to the fact that the spring of the cable causes it to spring out of the hook unless tension is maintained on the cable at all times. Moreover, the loop frequently tends to become loosened, allowing the object being handled to disengage itself therefrom. The cable fastening means on the hook is also usually subject to the disadvantage that it tends to form distortions in the cable loop which then fails to fit snugly around the object being handled.

It is an object of this invention to provide a choker hook of simple and inexpensive structure and having cable loop holding means which is capable of convenient and rapid engagement of a cable loop thereby and which is more positive and effective in operation. Another object is to provide simple and effective means, in association with such hook, for anchoring the end of a cable loop therein without distortion of such loop.

Figure 1:
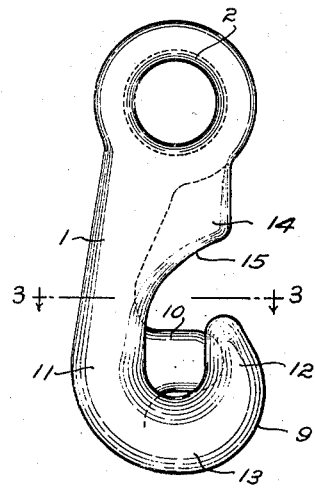
Figure 2:
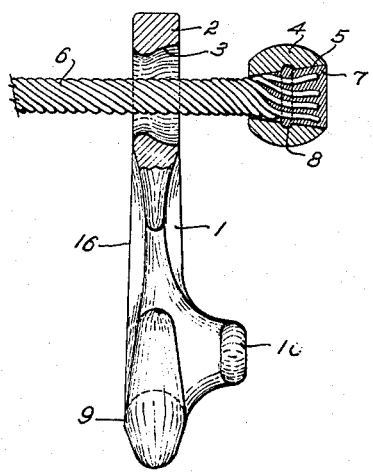
Figure 3:
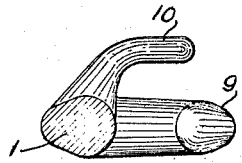
Figure 4:
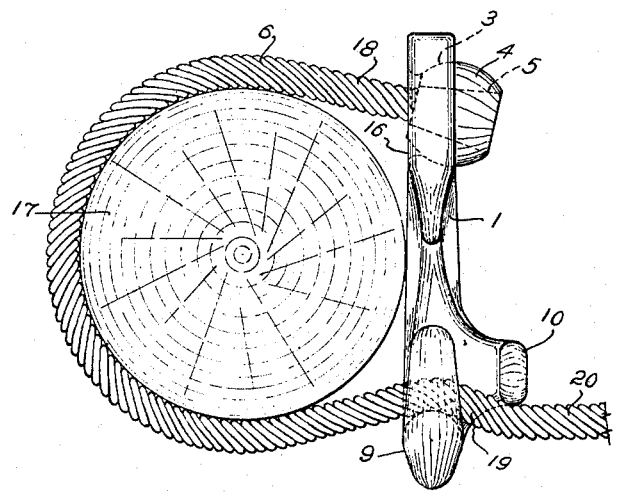

Other objects, advantages and details of the invention will become apparent from the following description, with particular reference to the accompanying drawing, in which Figure 1 is a side elevation of a choker hook in accordance with the invention, Figure 2 is an edge elevation, partly in section, of the hook, Figure 3 is a section on line 3—3 of Figure 1, and Figure 4 is an edge elevation of the hook and choker line in association with an object to be handled thereby.

In the drawing, the hook has a main body portion or shank 1, provided at one end thereof with an eye 2 having a substantially semi-spherical socket 3. A substantially spherical ferrule or ball 4 is adapted to seat in the socket 3 and is provided with a tapered opening 5 extending axially therethrough. One end of opening 5 has a diameter substantially equal to that of the choker line or cable 6 with which the hook is associated, the other end of the cable, which is passed through the eye 2, is anchored in the ball 4 by separating the strands of the cable within the enlarged portion of the opening and filling the voids with a molten brazing metal 7, which, when hardened, securely anchors the cable end therein. An annular groove 8 may be provided in the wall of the opening 5 to provide additional anchoring means for the metal 7.

The other end of the shank is provided with a hook portion 9 of usual form. Extending laterally from the lower portion of the shank is a single lug or wing 10, such lug throughout the major portion of its length being laterally spaced from the adjacent sides of the arms 11 and 12 of the hook portion 9 a distance slightly greater than the diameter of cable 6. It will also be observed that the outer end of lug 10 extends laterally beyond the inner face of outer arm 12 of the hook portion 9, thus laterally overlapping such arm 12. The upper edge of lug 10 lies slightly below the upper end of arm 12 and the lower edge of lug 10 lies slightly above the upper edge of web section 13 of hook portion 9.

Extending laterally from shank 1 in the same direction as hook portion 9 is a reinforcing rib 14 having its upper end merging into the eye portion of the hook and its lower end curved, as indicated at 15, to permit insertion of the cable loop between such lower end and the upper end of hook arm 12.

It will be observed that the side face 16 of the shank, lying opposite to the lug carrying face, lies in a plane uninterrupted by any portion of the choker hook.

In use, as shown in Figure 4, the cable 6 is looped around an object, such as a log 17, inserted into the hook portion 9, passed under the lug 10, and pulled tight. It will be observed that the ball 4 will automatically adjust itself in socket 3 to provide a straight undistorted end portion 18 of the loop. The flat face 16 of the hook bears upon the object without interference by other portions of the hook. The lug 10, which bridges the arms 11 and 12 of the hook portion, positively prevents the cable from accidental displacement from the hook portion. Moreover, since the lower edge of lug 10, under which the cable passes, and the upper edge of web 13 of the hook portion, over which the cable passes, are disposed in respective planes, the distance between which is considerably less than the diameter of the cable, a crimp 19 is produced in the cable which effectively prevents slackening of the loop about the object regardless of slackening of the main portion 20 of the cable line. The cable is readily inserted or removed from the hook portion 9 by slackening the main line and passing it over the end of lug 10.

It will be apparent that the design of the choker hook is such that it permits the maximum strength of the choker cable to be developed, without undue strain on or damage to local areas of the hook or cable. Because of such freedom from localized strains the hook may be lighter in weight than present day hooks of equal strength. Moreover, the hook is such that it may be cast readily from high strength steel and, because of its light weight and convenient manufacture, may be inexpensively produced.

What is claimed is:

1. A choker hook of unitary structure and comprising a shank, means forming an eye at one end of the shank, a hook portion at the other end of the shank having a pair of spaced arms for reception of a cable therebetween and a web connecting the lower ends of the arms, a lug carried by the shank and extending laterally from one face thereof, said lug completely bridging the space between said arms and being laterally spaced from said arms, the lower edge of said lug being disposed in a plane lying below the major portions of said arms, the opposite face of said shank being flat and constituting an object-engaging face lying in a plane unobstructed by other portions of said hook.

2. A choker cable comprising a choker hook having a shank, means forming an eye having a substantially semi-spherical annular socket at one end of the shank and disposed on one lateral face of the shank, a ferrule having a complementary spherical surface arranged to seat in said socket, a cable having one end anchored in said ferrule and extending through said eye and beyond the opposite lateral face of the shank, a hook portion carried on the other end of said shank in alignment therewith and having an arm in spaced relation to the shank for reception of the cable therebetween and a web connecting the lower ends of said shank and arm, and a lug carried by the shank and having its outer end lying in laterally opposed and spaced relation to said arm, said opposite lateral face of the shank being flat and constituting an object-engaging face lying in a plane uninterrupted by other portions of the hook.

JOHN ACONLEY.

REFERENCES CITED

The following references are of record in the file of this patent:

UNITED STATES PATENTS

| Number | Name | Date |
|---|---|---|
| 1,446,781 | Benson | Feb. 27, 1923 |
| 1,649,654 | Benson | Nov. 15, 1927 |
| 1,669,152 | Yeaton | May 8, 1928 |
| 2,293,771 | Signalness | Aug. 25, 1942 |